(12) United States Patent
Ruet (10) Patent No.: US 11,794,878 B2
(45) Date of Patent: Oct. 24, 2023

(54) ASSEMBLY PROVIDED WITH A DISCONNECTABLE COUPLING SYSTEM HAVING A MECHANICAL FUSE AND A FRICTION BRAKE

(71) Applicant: AIRBUS HELICOPTERS, Marignane (FR)

(72) Inventor: Laurent Ruet, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/730,690

(22) Filed: Apr. 27, 2022

(65) Prior Publication Data

US 2022/0348312 A1 Nov. 3, 2022

(30) Foreign Application Priority Data

Apr. 28, 2021 (FR) ..................................... 2104419

(51) Int. Cl.
*B64C 13/34* (2006.01)
*B64C 13/28* (2006.01)
*B64C 13/04* (2006.01)

(52) U.S. Cl.
CPC ........ *B64C 13/343* (2018.01); *B64C 13/0427* (2018.01)

(58) Field of Classification Search
CPC ........................... B64C 13/343; B64C 13/0427
See application file for complete search history.

(56) References Cited

U.S. PATENT DOCUMENTS

| | | | | |
|---|---|---|---|---|
| 2,901,076 A | * | 8/1959 | Dean ......................... | F16D 9/06 318/475 |
| 2005/0236241 A1 | * | 10/2005 | Dusserre-Telmon ..... | F16C 7/00 188/371 |
| 2009/0283642 A1 | * | 11/2009 | Gemmati ................ | F16D 7/042 464/35 |
| 2010/0203974 A1 | * | 8/2010 | Janker ................. | F16H 25/2021 464/30 |
| 2011/0031346 A1 | * | 2/2011 | Allieta .................... | B64C 27/68 244/17.13 |
| 2015/0014480 A1 | * | 1/2015 | Lebernicheux ......... | B64C 13/34 244/99.3 |

(Continued)

FOREIGN PATENT DOCUMENTS

| | | |
|---|---|---|
| EP | 1506354 A1 | 2/2005 |
| EP | 2266878 A1 | 12/2010 |

(Continued)

OTHER PUBLICATIONS

French Search Report for French Application No. FR2104419, Completed by the French Patent Office, dated Dec. 5, 2021, 8 pages.

*Primary Examiner* — Justin M Benedik
(74) *Attorney, Agent, or Firm* — Brooks Kushman P.C.

(57) ABSTRACT

An assembly comprising a first part and a second part, the assembly comprising a disconnectable coupling system provided with a mechanical fuse for securing the first part and the second part according to an axis of movement up to a breaking threshold. The assembly comprises at least one single-use friction brake interposed between the first part and the second part, the friction brake braking a movement of the first part with respect to the second part after the mechanical fuse has broken.

15 Claims, 4 Drawing Sheets

(56) References Cited

U.S. PATENT DOCUMENTS

2020/0269969 A1\* 8/2020 Honnorat ................ B64C 13/36

FOREIGN PATENT DOCUMENTS

| EP | 3702278 A1 | 9/2020 |
| --- | --- | --- |
| FR | 2931131 A1 | 11/2009 |
| FR | 3008457 A1 | 1/2015 |
| JP | H074935 U | 1/1995 |
| WO | 03100288 A1 | 12/2003 |

\* cited by examiner

ASSEMBLY PROVIDED WITH A DISCONNECTABLE COUPLING SYSTEM HAVING A MECHANICAL FUSE AND A FRICTION BRAKE

CROSS REFERENCE TO RELATED APPLICATIONS

This application claims priority to French patent application No. FR 21 04419 filed on Apr. 28, 2021, the disclosure of which is incorporated in its entirety by reference herein.

TECHNICAL FIELD

The present disclosure relates to an assembly provided with a disconnectable coupling system having a mechanical fuse and a friction brake. Such an assembly may be arranged in particular within a flight control system of an aircraft.

BACKGROUND

The expression "disconnectable coupling system" means that this system can mechanically couple or uncouple two elements, depending on the situation. Such a system can be applied to various items of equipment and, for example, to shock-absorbers, engine anticipators, actuators, etc.

In particular, an aircraft may comprise actuators arranged in parallel or in series in flight control channels. An actuator arranged in parallel with a flight control channel is conventionally referred to by a person skilled in the art as a "trim actuator", and is referred to as such hereinafter.

For example, the aircraft comprises a flight control that can be operated by a pilot. The flight control is connected by a mechanical flight control channel to a control member of the aircraft. Such a control member may comprise a blade of a rotor or of a propeller, a flap or an equivalent, for example. Therefore, at least one series actuator may be incorporated into the mechanical flight control channel, and a trim actuator may be connected to the mechanical flight control channel.

For example, a trim actuator comprises a rotary motor connected by a mechanical link to an output lever. The output lever is engaged with the mechanical flight control channel. Such a mechanical link may comprise at least one shaft, at least one gear, and/or a spring box, for example.

When the motor is operated, the output lever rotates and moves at least one member of the mechanical flight control channel.

If a pilot operates the flight control, the mechanical flight control channel also causes the output lever to rotate. In normal conditions, the trim actuator does not immobilize the mechanical flight control channel.

However, if a trim actuator seizes, the entire mechanical flight control channel may be immobilized.

In order to prevent a seized trim actuator from immobilizing the associated mechanical flight control channel, a disconnectable coupling system may be used.

Such a disconnectable coupling system may comprise an electromagnetic system provided with an electric coil. An electromagnetic system is particularly beneficial when the forces transmitted between the parts to be coupled are moderate. Conversely, such a coupling system may have a significant mass and space requirement when significant forces need to be transmitted.

Another disconnectable coupling system may comprise a mechanical fuse. The mechanical fuse is dimensioned in order to break when the trim actuator is immobilized and when the pilot applies a deliberately high force to the flight control.

According to one example, a trim actuator may comprise a motor rotating an output shaft via an internal mechanical power transmission channel. In normal conditions, this output shaft is constrained to rotate with an output lever by means of a fuse pin. The output lever is mechanically connected to the associated mechanical flight control channel. In normal operation, the pin transmits mechanical torque between the output lever and the motor. In the event of the trim actuator seizing as a result of an internal failure, the pilot is able to physically feel that the mechanical flight control channel is immobilized. The pilot can then increase the force he or she is applying to the flight control. When the pin's breaking threshold is reached, the pilot's action on the flight control causes the pin to break. In this new configuration, the output lever is free to rotate relative to the immobilized output shaft. The pilot can therefore once again move the mechanical flight control channel.

Although satisfactory, this solution requires the dimensions of the pin to be very precise. Indeed, the breaking threshold must be established as a function of the operational forces and the desired service life so that any pilot, regardless of his or her physical strength, can produce the forces required to break it, and so as to avoid an untimely breakage as a result of fatigue.

The force the pilot needs to apply in order to break the pin must therefore be relatively high. Moreover, when the pin breaks, it does so suddenly. Therefore, at the time of this breakage, the pilot may have difficulties retaining the flight control and preventing unwanted movement of this flight control.

To remedy this, Document FR 2 931 131 describes a trim actuator having a retractable coupling device. This coupling device is provided with an immobilizing means and with a compression means and at least one drive means, for example a ball. In a normal configuration, each ball constrains the immobilizing means and the compression means to rotate in unison. For this purpose, the immobilizing means are provided with a discontinuous first housing that accommodates said drive means while the mechanical torque is below a threshold. The immobilizing means also includes a continuous second housing in the form of a groove describing a closed loop. The coupling device is provided with a means for moving each ball in an irreversible manner, without human intervention, from the first housing to the second housing, when the mechanical torque applied to the balls is greater than the predetermined torque. The balls then roll in the groove without transmitting mechanical torque.

Document FR 3 008 457 and document US 2010/0203974 are also known.

Document FR 3 008 457 describes a coupling mechanism between a control member generating manual flight commands and a trim actuator forming part of a mechanical flight control channel of an aircraft. The coupling mechanism comprises axial engagement means between a lever arm mechanically connected to the control member and a pivot shaft of the trim actuator.

Document US 2010/0203974 describes a motorized spindle drive device comprising a coupling that disengages when a predefined mechanical torque threshold is exceeded.

Documents EP 1 506 354, EP 2 266 878, EP 3 702 278 and JP H07 4935 U are also known.

Some solutions consist in using a mechanical fuse and, in parallel, parts that rub against each other or shock-absorbers. These solutions are beneficial but remain active after the mechanical fuse has broken. Their use therefore remains limited to the residual forces the pilot is still able to apply after uncoupling in order to continue to control the aircraft.

Document U.S. Pat. No. 2,901,076 A describes a system connecting a first part and a second part in rotation by means of pins. The first part also has a projection arranged in a notch of the second part in order to push the second part in the event of the pins breaking.

SUMMARY

An object of the present disclosure is therefore to propose an innovative assembly provided with a disconnectable coupling system, this assembly helping limit the speed of movement of a mechanical channel transmitting a movement following the breakage of a mechanical fuse.

The disclosure therefore relates to an assembly comprising a first part and a second part, the assembly comprising a disconnectable coupling system provided with a mechanical fuse for securing the first part and the second part according to an axis of movement up to a breaking threshold, i.e., for example, for securing the first part and the second part up to a breaking threshold in translation along the axis of movement or in rotation about the axis of movement.

This assembly comprises at least one single-use friction brake interposed between said first part and said second part, said friction brake braking a movement of the first part with respect to the second part after said mechanical fuse has broken, for example a movement according to said axis of movement.

By way of example, the first part is connected to a flight control channel and the second part is connected to a motor of a trim actuator. In the event of the second part becoming immobilized, the pilot can apply a considerable force to a flight control in order to break the mechanical fuse. During a transitional period, the brake or brakes brake the first part relative to the second part in order to prevent a control from moving in an undesirable manner.

Such an assembly may therefore tend to limit the risks of a flight control moving in an undesirable manner, under the action of a pilot, following the breaking of the mechanical fuse.

The expression "single-use" means that a given movement is braked only once. The friction brake therefore becomes inoperative at the end of the transitional period, unlike other solutions. In a flight control system, the friction brake greatly reduces the undesirable movement of a control following a break, then becomes inactive and does not interfere with piloting.

The assembly may include one or more of the following features.

A friction brake may thus comprise a stud that is trapped, when in a rest position, in a housing of the second part, before said break, said stud being arranged facing a wall of the first part, said stud and said wall being able to move relative to each other following said break, said wall applying a force to said stud, following said break and said movement, that moves said stud in translation relative to the second part.

The expression "trapped, when in a rest position" means that the stud is stationary, with respect to its housing, when no force is applied to this stud by the wall.

Therefore, after the mechanical fuse has broken, the wall comes into contact with the stud. The wall applies a force to the stud to move it into the respective housing. The translational movement of the stud helps dissipate energy via friction against the partitions delimiting the housing in which this stud is located. The friction brake is a single-use component insofar as the stud cannot return to its initial position reached before the mechanical fuse breaks.

According to one possibility compatible with the preceding possibilities, said stud may be able to move in translation along a translation axis orthogonal to the axis of movement.

Therefore, the relative movement of the first part with respect to the second part can thus cause the stud to move in translation.

According to one possibility compatible with the preceding possibilities, the wall may comprise two faces arranged to either side of said stud according to an axis orthogonal to a translation axis of said stud.

Consequently, the stud is moved in translation by the wall of the first part independently of the relative movement of the first part with respect to the second part. By way of illustration, when the first part and the second part are able to rotate, the stud may be moved in translation both when the first part rotates in a clockwise direction and when it rotates in an anticlockwise direction.

According to one possibility compatible with the preceding possibilities, each face may have a non-zero angle with respect to an axis orthogonal to a translation axis of said stud.

Such positioning allows the stud to be moved in translation in order to dissipate kinetic energy via friction against the second part.

According to one example, at least one of said two faces may be a planar face.

The friction obtained can be adjusted by adjusting the shape of the face in question.

According to one example, at least one of said two faces may be an at least partially skew face. The expression "at least partially skew face" denotes a face that is not planar, at least locally. For example, the at least partially skew face may be convex when viewed from the stud. According to another example, the at least partially skew face may comprise two planes that are not parallel.

Using a face that is not planar makes it possible to modulate the friction obtained, depending on the relative movement of the first part and the second part. For example, the face has a very large angle next to the translation axis and a smaller angle thereafter. Such a face helps obtain a high degree of friction directly after the fuse breaks, this friction then reducing.

According to another aspect, the stud may comprise a shoulder forming a positioning stop for positioning the stud suitably in the housing, when in a rest position.

According to another aspect, the head of the stud cooperating with the wall may be designed in various shapes. For example, the shape of the head may be frustoconical, rounded, etc.

According to another aspect, the stud may be in contact with the wall, when in a rest position, or a gap may separate the stud from the wall.

According to one embodiment, the mechanical fuse may comprise a fuse stop secured to the second part and bearing against said stud according to said translation axis.

The first part and the second part are then connected by the stud, in normal conditions. The mechanical fuse effectively holds the stud against the wall of the first part. The fuse breaks when the breaking threshold is passed. The wall pushes the stud, which moves in translation into its housing.

According to this embodiment, the mechanical fuse cooperates directly with a friction brake.

When several friction brakes are provided, at least one or indeed each friction brake may cooperate with a respective fuse stop.

According to another embodiment, the friction brake or brakes and the mechanical fuse are separate.

For example, the mechanical fuse may comprise a rod that extends into a first hole of said first part and into a second hole of said second part.

According to one possibility compatible with the preceding possibilities and, in particular, with the two described embodiments, the assembly may comprise one or more friction brakes and, for example, at most three friction brakes.

Using three friction brakes is a good compromise for isostatic load distribution.

An assembly may be used in multiple systems requiring a disconnectable connection.

For example, the disclosure also relates to an actuator provided with a motor and such an assembly. The motor is then connected by a mechanical link to the second part or to the first part.

Such a mechanical link may be of a conventional type, for example comprising at least one shaft, at least one gear and/or a spring box.

The assembly may be arranged within a housing comprising the motor, or outside such a housing.

The disclosure also relates to a vehicle comprising such an assembly, for example within an actuator.

Optionally, the first part or the second part is connected to a motor by a mechanical link, the first part or the second part that is not connected to the mechanical link being connected to a mechanical flight control channel that extends from a flight control that can be operated by a pilot to a control member of the vehicle. During a journey, a movement of the control member under the action of the flight control causes the vehicle to move.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
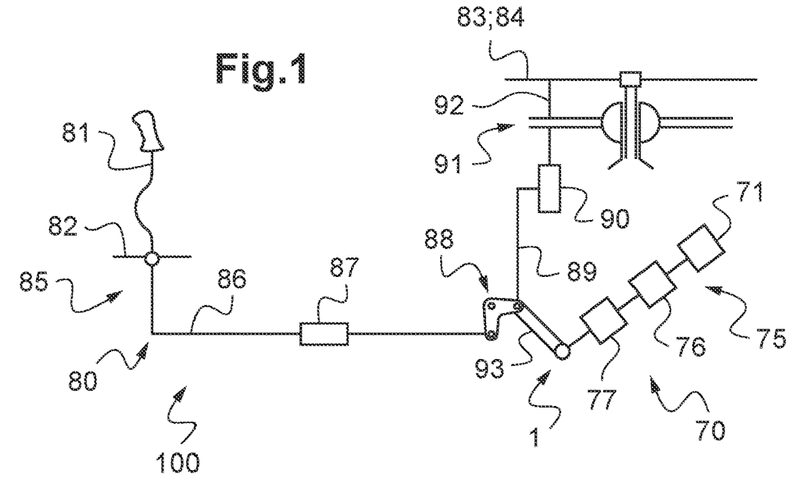
FIG. 1 is a diagram showing a vehicle according to the disclosure.

FIG. 1 shows an assembly 1 according to the disclosure arranged in a mechanical system, possibly a shock-absorbing system, an engine anticipator system, etc.

For example, the assembly 1 is arranged in a mechanical system of a vehicle 100 between a control 81 and a control member of the vehicle 100.

According to the particular example shown in FIG. 1, the vehicle 100 is an aircraft that comprises a flight control 81. According to this example, the flight control 81 comprises a stick that can be moved relative to a floor 82. The flight control 81 is used to control a control member 83 such as a blade 84, optionally via a control architecture that comprises an assembly 1 according to the disclosure.

By way of illustration, the flight control 81 is connected to the control member 83 by a mechanical transmission channel 85. This channel 85 may be a mechanical flight control channel that comprises, for example, at least one connecting rod 86, 89, at least one series actuator 87, and/or at least one bellcrank 88. This channel 85 may lead to a servocontrol 90. Moreover, the servocontrol 90 may be fastened to a non-rotating swashplate of a set 91 of swashplates, the rotating swashplate of this set 91 of swashplates being connected to the blades 84 via respective pitch rods 92. Therefore, the assembly 1 may be used at the output of or in an actuator 70 according to the disclosure, for example in a trim actuator arranged in parallel with the channel 85.

By way of illustration, such an actuator 70 may comprise a motor 71. FIG. 1 shows a linear motor, but the disclosure can also be applied to a rotary motor.

A mechanical link 75 then connects the motor 71 to the assembly 1. The mechanical link may comprise a spring box 76, at least one gear 77, etc.

Moreover, the assembly 1 is connected to the channel 85, either directly or via at least one connecting rod 93.

Although FIG. 1 shows an actuator provided with an assembly 1 according to the disclosure, such an assembly 1 can be arranged in various systems without going beyond the ambit of the disclosure. For example, such an assembly 1 may be arranged in another type of vehicle, in an assembly line, a factory, a shock-absorbing system, an engine anticipator system and, more generally, in any system requiring a system that disconnects when a breaking threshold is passed.

Figure 6:
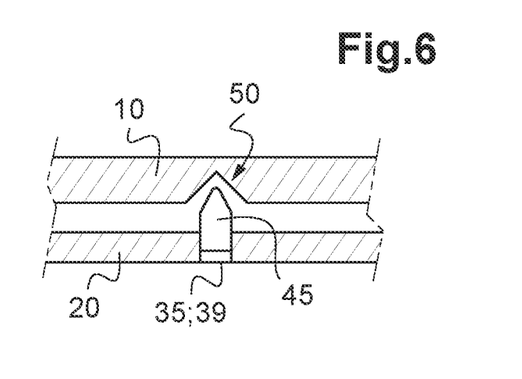
FIG. 6 is a diagram showing an example of an assembly that is able to move in translation having a mechanical fuse cooperating with a friction brake.
Figure 7:
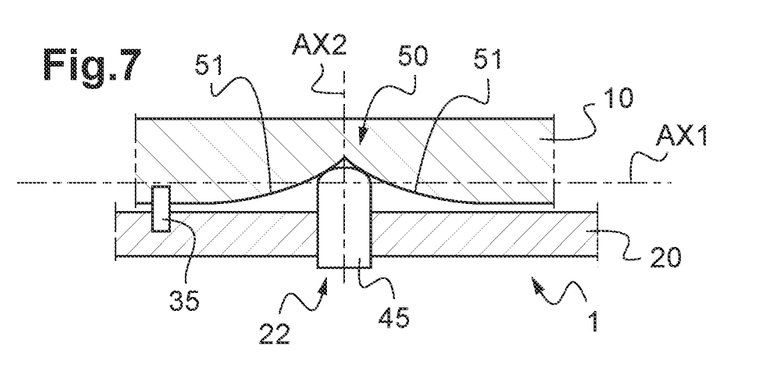
FIG. 7 is a diagram showing a wall having two faces that are convex when viewed from the stud.
Figure 8:
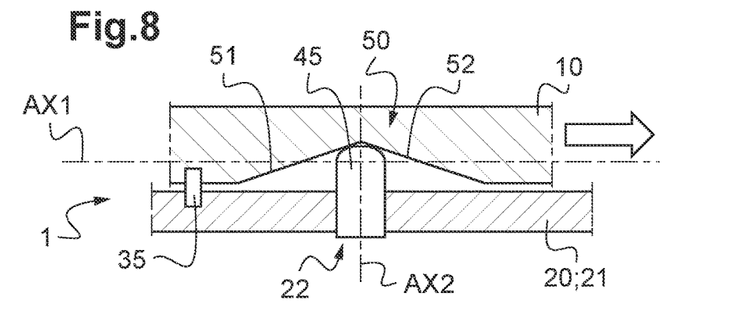
FIG. 8 is a diagram showing an assembly having a second immobilized part.
Figure 11:
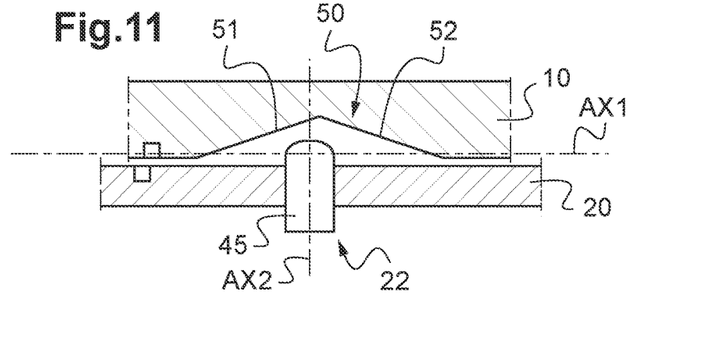
FIG. 11 is a diagram showing an assembly following the breakage of a mechanical fuse of an assembly.

Irrespective of the arrangement of an assembly 1 according to the disclosure, FIGS. 2 to 7 show various variants of this assembly 1. FIGS. 8 and 11 show the operation of such an assembly 1.

Figure 2:
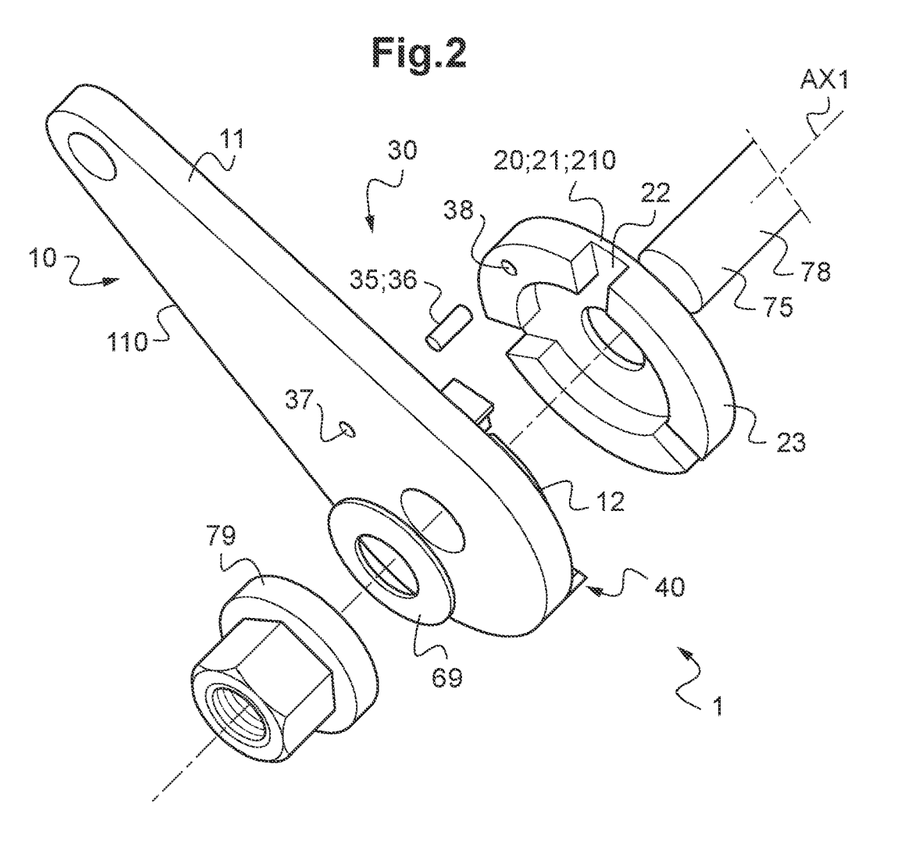
FIG. 2 is an exploded view showing an example of a rotary assembly having an independent mechanical fuse.

Irrespective of the embodiment, and with reference to FIG. 2, for example, the assembly 1 comprises a first part 10 and a second part 20 that are connected up to a breaking threshold. The second part 20 may comprise a second support 21 and the first part 10 may comprise a first support 11. In the context of an actuator 15, the second support 21 may be connected to the mechanical link 75 and the first support 11 may be connected to the channel 85. The reverse is also possible.

Furthermore, the support connected to the channel 85, the first support 11 according to FIG. 2, may comprise a lever 110. The other support, the second support 21 according to FIG. 2, may comprise a flange 210 constrained to rotate, if applicable, with a connecting shaft 78 of the mechanical link 75. In particular, a nut 79 may be screwed to one end of the connecting shaft 78 in order to couple the first part 10 to the second part 20. A flexible washer 69 may be arranged between the nut 79 and the first part 10, the flange 210 of the second part 20 being pressed against a shoulder of the connecting shaft 78.

Irrespective of this aspect, the assembly 1 comprises a coupling system 30 which secures the first part 10 and the second part 20 along/about the axis of movement AX1, up to a breaking threshold. According to FIGS. 2 to 4, the first part 10 and the second part 20 may be constrained to rotate with each other about the axis of movement AX1. According to the examples of FIGS. 5 to 7, the first part 10 and the second part 20 may be secured in translation along the axis of movement AX1.

In all cases, this coupling system 30 comprises at least one mechanical fuse 35. The mechanical fuse 35 is dimensioned to break in predetermined conditions, for example in the presence of a predetermined mechanical torque or a predetermined force between the first part 10 and the second part 20.

Moreover, the coupling system 30 comprises one or more friction brakes 40, possibly up to three friction brakes. The term "each" is used hereinafter irrespective of the number of friction brakes, both when a single friction brake is provided and when several friction brakes are provided.

Irrespective of the variant of the disclosure, the breaking of the mechanical fuse 35 causes stress to be applied to each friction brake 40. Each friction brake 40 then automatically brakes the movement of the first part 10 relative to the second part 20. This braking has the result of preventing the first part 10 or the second part 20 from moving in an undesirable manner, following the breaking of the mechanical fuse 35.

Each friction brake 40 may comprise a stud 45 that is trapped, when in a rest position, in a housing 22 of the second part 20. For this purpose, a portion of the second part 20 has a partition delimiting a hole forming the housing 22. For example, the housings 22 and the studs are rectangular in shape.

Following the breaking of the mechanical fuse 35, the stud 45 can move in translation relative to the housing 22, along a translation axis AX2, rubbing against the partition of the housing 22. The translation axis AX2 may be substantially orthogonal to the axis of movement AX1.

Furthermore, the stud 45 extends along the translation axis AX2 from a foot 47 to a head 46.

The foot 47 may comprise a shoulder 48 that abuts, when in a rest position, against the second part 20. The head 46 may be in various shapes, for example a frustoconical shape extended by a rounded end, according to the example shown in FIG. 3. The stud 45 therefore passes all the way through the portion of the second part 20 having the housing 22, the head 46 extending out of the housing 22.

In order to move a stud 45 relative to the respective housing 22, the friction brake 40 comprises a wall 50 of the first part 10 that is suitable for moving the stud 45 by shape interference.

In particular, the wall 50 is arranged facing the head of the stud 45 according to the translation axis AX2. In addition, the wall 50 is arranged to either side of the head 46 of the stud 45 according to an axis orthogonal to the translation axis AX2. For example, this wall 50 may comprise two faces 51, 52 arranged respectively to either side of the stud 45 according to an axis AX3 orthogonal to the translation axis AX2 of the stud 45. The head 46 of the stud 45 is thus arranged between the two faces 51, 52.

Optionally, each face 51, 52 has a non-zero angle ANG relative to the axis AX3.

Figure 3:
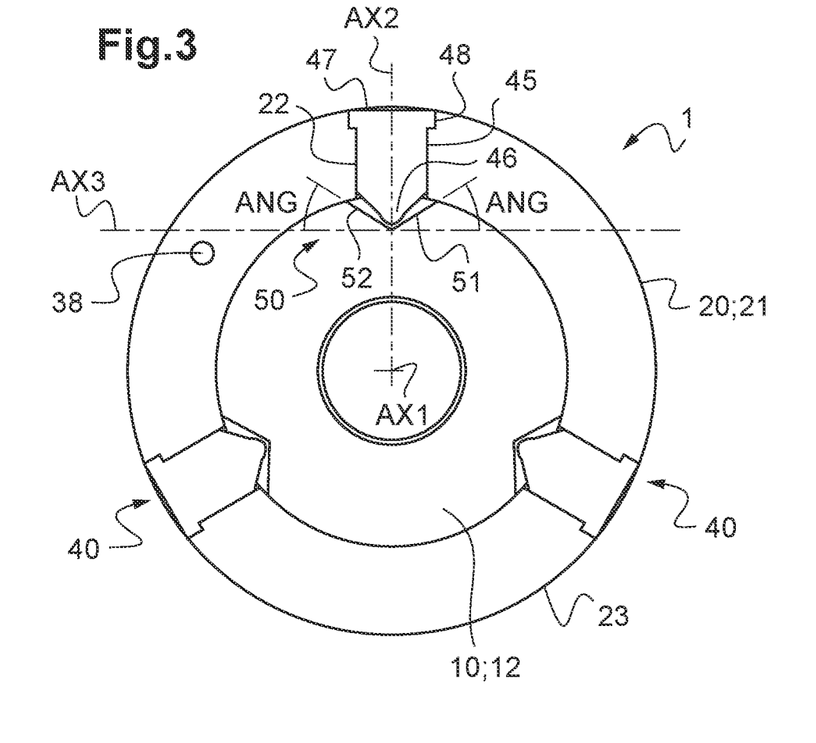
FIG. 3 is a cross-sectional view of the example of an assembly shown in FIG. 2.

The faces 51, 52 may be in shapes determined in order to obtain the desired braking profile. For example, at least one face 51, 52 may be a planar face, as shown in FIG. 3. According to FIG. 7, at least one face 51, 52 is an at least partially skew face. FIG. 7 shows faces that are convex when viewed from the stud 45. According to another example, one face may comprise at least two planar facets having two different angles with respect to the axis AX3.

As indicated above, FIGS. 2-3, 4, 5 and 6 show various variants.

Figure 4:
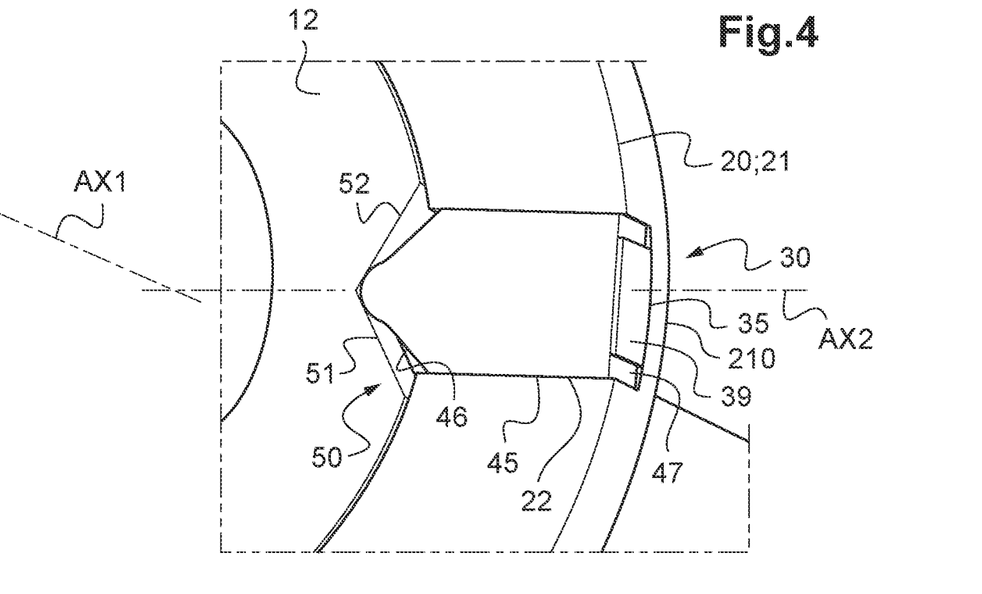
FIG. 4 is a partial cross-sectional view of an example of a rotary assembly having a mechanical fuse cooperating with a friction brake.

According to a first embodiment shown by the variants of FIGS. 2-4, the first part 10 and the second part 20 are able to rotate relative to each other.

Consequently, each stud 45 is able to move according to a translation axis AX2 that is radial to the axis of movement AX1. In addition, the wall 50 may be located radially between the respective stud 45 and the axis of movement AX1. Each stud 45 is also located, in azimuth with respect to the axis of movement AX1, between the two faces 51, 52 of the respective wall 50.

Optionally, each wall 50 may be provided at a periphery of a first ring 12. This first ring 12 is centered on the axis of movement AX1 and is secured to the first support 11. Similarly, each housing 22 may be arranged in a second ring 23 centered on the axis of movement AX1. This second ring 23 is secured to the second support 21. Each housing 22 can pass through the second ring 23 radially, in relation to the axis of movement AX1.

According to the first variant of the first embodiment shown in FIGS. 2 and 3, the mechanical fuse 35 is separate from the friction brake or brakes 40. The mechanical fuse 35 may then comprise a rod 36 that extends into a first hole 37 of the first part 10 and into a second hole 38 of the second part 20. Consequently, the head 46 of a stud 45 may or may not touch the respective wall 50 when in a rest position, i.e., when the mechanical fuse 35 is not broken.

In normal conditions, the first part 10 and the second part 20 are constrained to rotate with each other, about the axis of movement AX1, by the mechanical fuse 35. Each stud 45 is then inactive or can help constrain the first part 10 and the second part 20 in rotation.

According to the second variant of the first embodiment shown in FIG. 4, the mechanical fuse 35 cooperates with a stud 45 of a friction brake 40. The mechanical fuse 35 comprises a fuse stop 39 secured to the second part 20. This fuse stop 39 bears against the stud 45 according to the translation axis AX2, this stud 45 also bearing against the wall 50. In other words, the stud 45 is immobilized in translation, along the translation axis AX2, between a wall 50 and the fuse stop 39. For example, the fuse stop 39 is in the form of a tab, which may be elastic in order to push the stud, secured to the second support 21 and delimiting the associated housing 22. According to another example, the fuse stop may be in the form of a band.

In normal conditions, the first part 10 and the second part 20 are constrained to rotate with each other, about the axis of movement AX1, by the stud 45.

Figure 5:
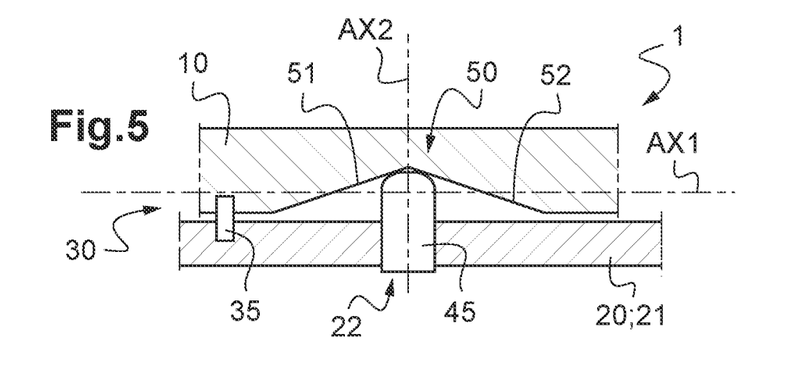
FIG. 5 is a diagram showing an example of an assembly that is able to move in translation having an independent mechanical fuse.

According to a second embodiment shown in FIGS. 5 and 6, the first part 10 and the second part 20 are able to move in translation relative to each other. As in the first embodiment, the mechanical fuse 35 may be separate, as shown in FIG. 5, or may cooperate with a stud 45, as shown in FIG. 6.

FIGS. 8 to 11 show the operation of an assembly 1 according to the disclosure. In order to facilitate understanding, the method is shown with an assembly 1 according to FIG. 5. However, the other variants of the assembly 1 function in an identical manner.

According to FIG. 8, in normal conditions, the mechanical fuse 35 constrains the first part 10 and the second part 20 to move in unison with respect to the axis of movement AX1. According to the variants of FIGS. 2, 3 and 5, the mechanical fuse 35 as such links the first part 10 and the second part 20. According to the variants of FIGS. 4 and 6, the mechanical fuse 35 immobilizes a stud 45 which constrains the first part 10 and the second part 20 to move in unison.

Figure 9:
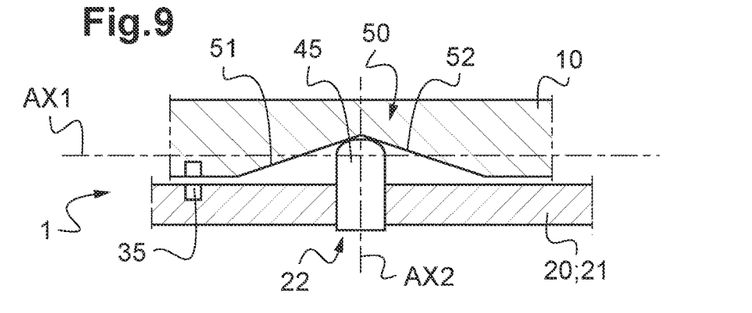
FIG. 9 is a diagram showing the breakage of a mechanical fuse of an assembly.

According to FIG. 9, when a breaking threshold of the mechanical fuse 35 is reached, the mechanical fuse 35 breaks.

In a vehicle 100 according to FIG. 1, such a situation may occur if the motor 71 or the mechanical link 75 connected to the assembly 1 has seized. In such a situation, the assembly 1 is immobilized. A pilot can then operate the flight control 81 connected to the assembly 1 in order to break the mechanical fuse 35 and release this flight control 81.

Figure 10:
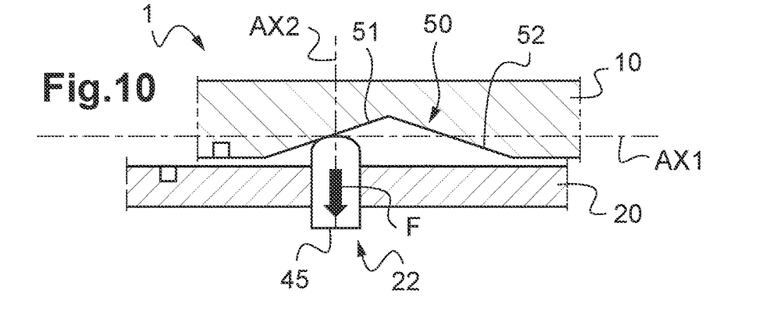
FIG. 10 is a diagram showing the activation of a friction brake following the breakage of a mechanical fuse of an assembly.

According to FIG. 10, the first part 10 then moves relative to the second part 20. Each wall 50 then applies a force to the respective stud 45. This stud 45 moves in the respective housing 22 in the direction shown by the arrow F. The friction of the stud 45 against the edges of the respective housing 22 helps dissipate energy and brake the relative movement of the first part 10 and the second part 20. According to the above example, this dissipation helps prevent the flight control from moving in an undesirable manner.

According to FIG. 11, at the end of this movement, the stud 45 becomes inactive. The first part 10 is then able to move relative to the second part 20. According to the above example, the pilot can operate the flight control freely.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure as claimed.

What is claimed is:

1. An assembly comprising a first part and a second part, the assembly comprising a disconnectable coupling system provided with a mechanical fuse for securing the first part and the second part according to an axis of movement up to a breaking threshold,
wherein the assembly comprises at least one single-use friction brake interposed between the first part and the second part, the friction brake braking a movement of the first part with respect to the second part after the mechanical fuse has broken, the friction brake comprising a stud that is trapped, when in a rest position, in a housing of the second part before the break, the stud being arranged facing a wall of the first part, the stud and the wall being able to move relative to each other following the break, the wall applying a force to the stud, following the break and the movement, that moves the stud in translation relative to the second part.

2. The assembly according to claim 1,
wherein the stud is able to move in translation along a translation axis orthogonal to the axis of movement.

3. The assembly according to claim 1,
wherein the wall comprises two faces arranged to either side of the stud according to an axis orthogonal to a translation axis of the stud.

4. The assembly according to claim 3,
wherein each face has a non-zero angle with respect to the axis orthogonal to a translation axis of the stud.

5. The assembly according to claim 3,
wherein at least one of the two faces is a planar face.

6. The assembly according to claim 3,
wherein at least one of the faces is an at least partially skew face.

7. The assembly according to claim 6,
wherein the at least partially skew face is convex when viewed from the stud.

8. The assembly according to claim 1,
wherein the mechanical fuse comprises a fuse stop secured to the second part and bearing against the stud according to the translation axis.

9. The assembly according to claim 1,
wherein the mechanical fuse comprises a rod that extends into a first hole of the first part and into a second hole of the second part.

10. The assembly according to claim 1,
wherein the assembly comprises at most three friction brakes.

11. An actuator provided with a motor,
wherein the actuator comprises the assembly according to claim 1, the motor being connected by a mechanical link to the second part or to the first part.

12. A vehicle,
wherein the vehicle comprises the assembly according to claim 1.

13. The vehicle according to claim 12,
wherein the first part or the second part is connected to a motor by a mechanical link, the first part or the second part that is not connected to the mechanical link being connected to a mechanical flight control channel that extends from a flight control that can be operated by a pilot to a control member of the vehicle.

14. The assembly according to claim 1,
wherein the wall applying the force to the stud, following the break and the movement, that moves the stud in translation relative to the second part moves the stud in translation relative to the housing of the second part whereby friction of the stud against the housing of the second part brakes the movement.

15. An assembly comprising:
a first part and a second part;
a disconnectable coupling system provided with a mechanical fuse which secures together the first part and the second part according to an axis of movement up to a breaking threshold;
the mechanical fuse being broken upon the breaking threshold being reached in response to a movement of the first part with respect to the second part according to the axis of movement while the second part is seized;
a single-use friction brake interposed between the first part and the second part, the friction brake braking the movement of the first part with respect to the second part after the mechanical fuse has broken,
the friction brake including a stud, the stud being arranged facing a wall of the first part and being arranged within a housing of the second part, the stud being trapped in the housing of the second part prior to the mechanical fuse being broken, the stud and the wall of the first part being movable relative to each other after the mechanical fuse has broken, and the wall of the first part, following the movement of the first part with respect to the second part after the mechanical fuse has broken, applying a force to the stud that moves the stud in translation relative to the housing of the second part whereby friction of the stud against the housing of the second part brakes the movement of the first part with respect to the second part.

* * * * *